United States Patent
Solbrig (10) Patent No.: US 7,707,824 B2
(45) Date of Patent: May 4, 2010

(54) EXCESS NH3 STORAGE CONTROL FOR SCR CATALYSTS

(75) Inventor: Charles E. Solbrig, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 592 days.

(21) Appl. No.: 11/786,036

(22) Filed: Apr. 10, 2007

(65) Prior Publication Data
US 2008/0250778 A1 Oct. 16, 2008

(51) Int. Cl.
F01N 3/00 (2006.01)
(52) U.S. Cl. .............. 60/286; 60/274; 60/295
(58) Field of Classification Search .......... 60/276, 60/285, 286, 295, 301
See application file for complete search history.

(56) References Cited

U.S. PATENT DOCUMENTS 6,993,900 B2 * 2/2006 Upadhyay et al. ............. 60/286

2004/0098974 A1 * 5/2004 Nieuwstadt et al. .......... 60/286
2008/0216463 A1 * 9/2008 Chaineux et al. ............. 60/274

FOREIGN PATENT DOCUMENTS

JP 2006138273 A * 6/2006

* cited by examiner

Primary Examiner—Marvin M Lateef
Assistant Examiner—Audrey Klasterka (57) ABSTRACT

A method of regulating an amount of NH3 stored in a catalyst of an exhaust after-treatment system includes determining a mass of NH3 into the catalyst based on a dosing rate of a dosing agent that is injected into an exhaust stream upstream of the catalyst and determining a mass of NH3 out of the catalyst. An accumulated mass of NH3 within the catalyst is calculated based on the mass of NH3 into the catalyst and the mass of NH3 out of the catalyst. The dosing rate is regulated based on the accumulated mass of NH3 within the catalyst.

22 Claims, 6 Drawing Sheets

EXCESS NH3 STORAGE CONTROL FOR SCR CATALYSTS

FIELD

The present disclosure relates to exhaust treatment systems, and more particularly to an excess NH3 storage control for an exhaust treatment system including a selective catalytic reduction (SCR) catalyst.

BACKGROUND

The statements in this section merely provide background information related to the present disclosure and may not constitute prior art.

Internal combustion engines combust an air and fuel mixture to generate drive torque. The combustion process generates exhaust that is exhausted from the engine to atmosphere. The exhaust contains nitrogen oxides (NOx), carbon dioxide ($CO_2$), carbon monoxide (CO) and particulates. NOx is a term used to describe exhaust gases that consist primarily of nitrogen oxide (NO) and nitrogen dioxide ($NO_2$). An exhaust after-treatment system treats the exhaust to reduce emissions prior to being released to atmosphere. In an exemplary exhaust after-treatment system, a dosing system injects a dosing agent (e.g., urea) into the exhaust upstream of a selective catalytic reduction (SCR) catalyst. The exhaust and dosing agent mixture reacts over the SCR catalyst to reduce the NOx levels released to atmosphere.

The dosing agent reacts with NOx on the SCR catalyst to accomplish the NOx reduction. More specifically, the dosing agent breaks down to form ammonia (NH3), which is the reductant utilized to react with the NOx. The following exemplary, chemical relationships describe the NOx reduction:

$$4NO + 4NH_3 + O_2 \rightarrow 4N_2 + 6H_2O$$

$$4NH_3 + 2NO + 2NO_2 \rightarrow 4N_2 + 6H_2O$$

$$3NO_2 + 4NH_3 \rightarrow 3.5N_2 + 6H_2O$$

To perform the above-described NOx reduction, the SCR catalyst stores NH3 therein. For an SCR catalyst to perform effectively, the NH3 storage level must be maintained at an adequate level. More specifically, the NOx reduction or conversion efficiency is dependent upon the NH3 storage level. In order to maintain high conversion efficiency under various operating conditions, the NH3 storage must be maintained. However, as the temperature of the SCR catalyst increases, the NH3 level must be reduced to avoid NH3 slip (i.e., excess NH3 being released from the SCR catalyst), which can reduce the conversion efficiency of the catalyst.

SUMMARY

Accordingly, the present disclosure provides a method of regulating an amount of NH3 stored in a catalyst of an exhaust after-treatment system. The method includes determining a mass of NH3 into the catalyst based on a dosing rate of a dosing agent that is injected into an exhaust stream upstream of the catalyst and determining a mass of NH3 out of the catalyst (i.e., consumed in the catalyst). An accumulated mass of NH3 within the catalyst is calculated based on the mass of NH3 into the catalyst and the mass of NH3 out of the catalyst. The dosing rate is regulated based on the accumulated mass of NH3 within the catalyst.

In one feature, the mass of NH3 out of the catalyst is determined based on signals generated by NOx sensors that are located upstream and downstream of the catalyst, respectively.

In another feature, the method further includes determining a conversion efficiency of the catalyst based on a temperature of the catalyst. The mass of NH3 out of the catalyst is determined based on a base dosing rate (i.e., stoichiometric) and the conversion efficiency.

In still another feature, the method further includes monitoring a catalyst temperature and setting the accumulated mass of NH3 within the catalyst equal to zero when the catalyst temperature exceeds a threshold temperature. In this manner, the areas of operation, in which the catalyst does not have any storage potential, are accounted for.

In yet other features, the method further includes defining a maximum NH3 storage mass of the catalyst based on a catalyst temperature. The dosing rate is regulated based on the maximum NH3 storage mass. An excess NH3 storage ratio is calculated based on the accumulated mass of NH3 within the catalyst and the maximum NH3 storage mass, wherein the dosing rate is regulated based on the excess NH3 storage ratio. For example, an adjustment factor is determined based on the excess NH3 storage ratio, wherein the dosing rate is regulated based said adjustment factor. The dosing agent is regulated to maintain the excess NH3 storage ratio to be less than 1.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
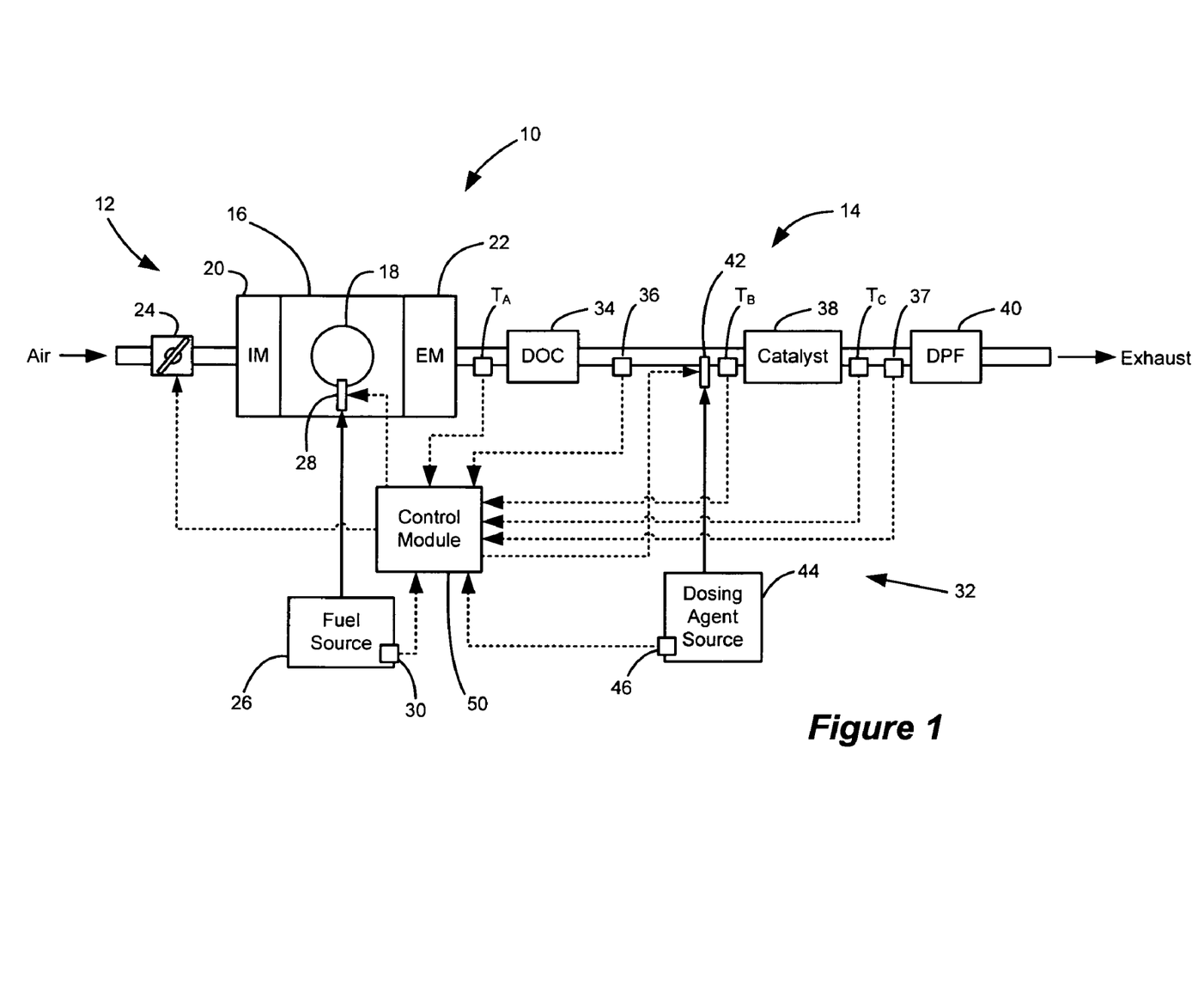
FIG. 1 is a functional block diagram of an engine system including an exhaust treatment system including a selective catalytic reduction (SCR) catalyst.

Referring now to FIG. 1, an exemplary vehicle system 10 is schematically illustrated. The vehicle system 10 includes an engine system 12, an exhaust after-treatment system 14. The engine system 12 includes an engine 16 having a cylinder 18, an intake manifold 20 and an exhaust manifold 22. Air flows into the intake manifold 20 through a throttle 24. The air is mixed with fuel and the air and fuel mixture is combusted within the cylinder 18 to drive a piston (not shown). Although a single cylinder 18 is illustrated, it is appreciated that the engine 12 may include additional cylinders 18. For example, engines having 2, 3, 4, 5, 6, 8, 10, 12 and 16 cylinders are anticipated. The fuel is provided from a fuel source 26 and is injected into the air stream using an injector 28. A fuel level sensor 30 is responsive to the amount of fuel within the fuel source 26. It is anticipated that the present disclosure can be implemented in both lean burn gasoline engines and diesel engines.

Exhaust is produced through the combustion process and is exhausted from the cylinder 18 into the exhaust manifold 22. The exhaust after-treatment system 14 treats the exhaust flowing therethrough to reduce emissions before being released to the atmosphere. The exhaust after-treatment system 14 includes a dosing system 32, a diesel oxidation catalyst (DOC) 34, a NOx sensor 36, a NOx sensor 37 and a catalyst 38 that is preferably provided as a selective catalytic reduction (SCR) catalyst.

The NOx sensor 36 is deemed the upstream NOx sensor and the NOx sensor 37 is deemed the downstream NOx sensor, relative to the catalyst 38. Both NOx sensors 36, 37 are responsive to a NOx level of the exhaust and generate respective signals based thereon. An upstream NOx mass flow rate ($\dot{m}_{NOXUS}$) is determined based on the signal generated by the NOx sensor 36. Similarly, a downstream NOx mass flow rate ($\dot{m}_{NOXDS}$) is determined based on the signal generated by the NOx sensor 37.

Temperature sensors $T_A$, $T_B$ and $T_C$ are located at various points along the emissions path. For example, the temperature sensor $T_A$ is located upstream of the DOC 34, the temperature sensor $T_B$ is located upstream of the catalyst 38 and the temperature sensor $T_C$ is located downstream of the catalyst 38. The DOC 34 reacts with the exhaust to reduce emission levels of the exhaust. It is also anticipated that a diesel particulate filter (DPF) 40 may be located downstream from the catalyst 30 that filters diesel particulates to further reduce emissions. It is anticipated that the order of the SCR catalyst and the DPF can be reversed.

The dosing system 32 includes a dosing agent injector 42, a dosing agent storage tank 44 and a dosing agent supply sensor 46. The dosing system 32 selectively injects a dosing agent (e.g., urea) into the exhaust stream to further reduce emissions. More specifically, the rate at which the dosing agent is injected into the exhaust stream ($\dot{m}_{DA}$) is determined based on the signals generated by one or more of the various sensors described herein. The exhaust and dosing agent mixture reacts within the catalyst 38 to further reduce exhaust emissions.

A control module 50 regulates flow of the dosing agent based on the excess NH3 storage control of the present disclosure. The excess NH3 storage control keeps track of the mass of NH3 supplied into ($m_{NH3IN}$) and out of ($m_{NH3OUT}$) the catalyst 38. Furthermore, the excess NH3 storage control makes corrections based on where the calculated storage amount is with respect to a maximum NH3 storage capacity ($m_{NH3MAX}$) of the catalyst 38.

$m_{NH3IN}$ is determined based the dosing agent or reductant (e.g., urea) input mass flow rate (i.e., $\dot{m}_{DA}$). $\dot{m}_{DA}$ is known and is determined based on the signal generated by the upstream NOx sensor 36. $m_{NH3IN}$ is further determined based on the exhaust flow rate, which is calculated based on MAF, a known fuel flow rate and other constants. $m_{NH3OUT}$ is the amount of NH3 that reacts with NOx within the catalyst 38 and is calculated based on the difference between $\dot{m}_{NOXUS}$, $\dot{m}_{NOXDS}$ and a time delta (dt). A set of constants is used to convert this difference to an NH3 mass out of the catalyst 38 ($m_{NH3OUT}$) (i.e., NH3 consumed). The difference ($\Delta m_{NH3}$) between $m_{NH3IN}$ and $m_{NH3OUT}$ is provided as the mass of NH3 stored in the catalyst 38.

The stored NH3 ($\Delta m_{NH3}$) is compared to $M_{NH3MAX}$, which is determined based on a temperature of the catalyst 38 ($T_{CAT}$). $m_{NH3IN}$ is adjusted to keep $\Delta m_{NH3}$ at a desired fraction of $m_{NH3MAX}$. In one embodiment, a simple ratio ($i_{EXCSNH3}$) is implemented. As another embodiment, a closed-loop control setpoint is provided as a fraction of $m_{NH3MAX}$. In this manner, NH3 release from the catalyst 38 that results from thermal transients can be reduced.

The mass flow rate of NH3 supplied into the catalyst 38 ($\dot{m}_{NH3IN}$) (e.g., provided in g/s) is calculated based on $\dot{m}_{DA}$, provided in g/hour, the concentration of the dosing agent ($DA_{CONC}$), the molecular weight of the dosing agent ($DA_{MW}$) (e.g., 60.06 g/mol in the case of urea), the molecular weight of NH3 ($NH3_{MW}$) (e.g., 17.031 g/mol) and the known decomposition factor of the dosing agent with respect to NH3 ($k_{DEC}$). $DA_{CONC}$ is determined as the percentage of dosing agent to dosing agent solution (e.g., 32.5% indicates 0.325 parts dosing agent to 1 part dosing agent solution). $k_{DEC}$ is provided in mol NH3 per mol dosing agent (e.g., in the case of urea, 1 mol of urea decomposes to 2 moles of NH3; $k_{DEC}=2$). $\dot{m}_{NH3IN}$ is calculated in accordance with the following relationship:

$$\dot{m}_{NH3IN}(g/s) = \frac{\dot{m}_{DA} \cdot DA_{CONC} \cdot k_{DEC} \cdot NH3_{MW}}{3600 \cdot DA_{MW}} \qquad (1)$$

where 3600 is a time conversion factor ($k_{TIME}$) of seconds per hour.

$\dot{m}_{NH3OUT}$ (e.g., provided in g/s) is the mass flow rate of NH3 consumed in the catalyst 38 and is calculated based on $\dot{m}_{NOXUS}$, provided in g/s, $\dot{m}_{NOXDS}$, provided in g/s, the molecular weight of the NOx ($NOx_{MW}$) and $NH3_{MW}$ (e.g., 17.031 g/mol). $NOx_{MW}$ is variable, however, any $NOx_{MW}$ can be used (e.g., $NO_2=46.055$ g/mol), because it cancels in the relationships described herein. $\dot{m}_{NH3OUT}$ is calculated in accordance with the following relationship:

$$\dot{m}_{NH3OUT} = \frac{[\dot{m}_{NOXUS} - \dot{m}NOXDS] \cdot NH3_{MW} \cdot X \,\text{mol\,NH3}}{NOx_{MW} \cdot 1 \,\text{mole\,NOX}} \qquad (2)$$

X varies from 1 to 1.333 depending on the upstream % of $NO_2$. $\dot{m}_{NOXUS}$ and $\dot{m}_{NOXDS}$ are calculated in accordance with the following relationship:

$$\dot{m}_{NOXUS,DS} = \frac{NOx(1\,ppm) \cdot 10^{-6}(molNOx/mol\,Exhaust) \cdot}{EXH_{MW}} \quad (3)$$

where $\dot{m}_{EXH}$ is the mass flow rate of the exhaust and $EXH_{MW}$ is the molecular weight of the exhaust gas (e.g., provided in g of exhaust/mol of exhaust).

Both $\dot{m}_{NH3IN}$ and $\dot{m}_{NH3OUT}$ are multiplied by a time increment (dt) (e.g., 1 second) to provide $m_{NH3IN}$ and $m_{NH3OUT}$, respectively, which are provided in grams. $\Delta m_{NH3}$ is determined as the difference between $m_{NH3IN}$ and $m_{NH3OUT}$ and is deemed the excess NH3 that is stored in the catalyst 38. $\Delta m_{NH3}$ (e.g., or $m_{NH3IN}$ and $m_{NH3OUT}$ before calculating $\Delta m_{NH3}$) can be integrated to provide a cumulative value over time ($\Delta m_{NH3CUM}$). $\Delta m_{NH3CUM}$ is divided by $m_{NH3MAX}$ to provide $i_{EXCSNH3}$.

$i_{EXCSNH3}$ is used as an input to a look-up table to look up an excess storage multiplier value ($k_{EXCSSTORE}$), which is fed back to the control module 50 to trim $\dot{m}_{DA}$. The look-up table is stored in memory and is calibrated in such a way to make the $k_{EXCSSTORE}$ equal to 1 at some desired storage ratio ($i_{DSR}$) of $NH3_{STOREMAX}$. For example, if $i_{EXCSNH3}$ is less than $i_{DSR}$, $k_{EXCSSTORE}$ is set to be greater than 1 and vise versa. In one embodiment, this function is executed by a closed-loop control (e.g., a PID control module).

It is preferable to control the $i_{DSR}$ to be sufficiently below 1 to avoid NH3 slip from occurring. In order to reduce accumulated errors, $\Delta m_{NH3CUM}$ is reset during high temperature catalyst operation where no significant NH3 storage occurs (i.e., when $T_{CAT}$ is greater than a threshold temperature ($T_{THR}$)). The catalyst temperature ($T_{CAT}$) is determined based on a temperature sensor signal (e.g., from one or more of the temperature sensors $T_A$, $T_B$, $T_C$ and/or a temperature sensor integrated into the catalyst (not shown)). As $T_{CAT}$ increases $NH3_{STOREMAX}$ decreases, thereby raising the $i_{EXCSNH3}$. This causes less dosing agent, and thus less NH3, to be dosed to the catalyst 38. By resetting $\Delta m_{NH3CUM}$, NH3 release from the catalyst 38 is reduced.

As mentioned above, $NH3_{STOREMAX}$ is the maximum possible NH3 stored at a given $T_{CAT}$. Described below is a method of determining $NH3_{STOREMAX}$. The catalyst 38, and exhaust after-treatment system for that matter, is stabilized to a constant temperature and the catalyst is purged of all stored NH3 (i.e., by providing no dosing agent, and thus no incoming NH3, to the catalyst). At this point, $\Delta m_{NH3CUM}$ is reset to 0 g. At some time ($t_0$), the dosing agent, and thus NH3, supply is turned back on with an excess NH3 to NOx molar ratio. The conversion efficiency of the downstream NOx sensor 37 and the upstream NOx sensor 36 will stabilize at a maximum value and at some latter time ($t_1$) will start decreasing (i.e., when the downstream NOx sensor 37 detects NH3). At this point, $\Delta m_{NH3CUM}$ is read to provide an approximate $NH3_{STOREMAX}$ value. The conversion efficiency is determined in accordance with the following relationship:

$$\%\,CONV = \left[\frac{NOx_{US} - NOx_{DS}}{NOx_{US}}\right] \cdot 100\% \quad (4)$$

Figure 2:
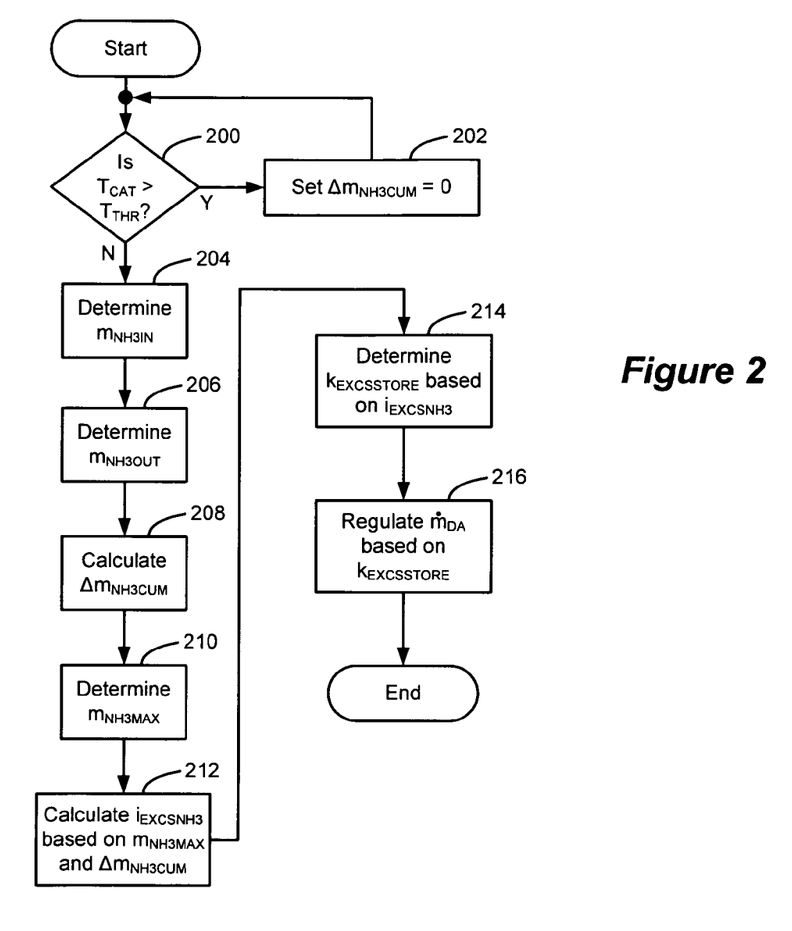
FIG. 2 is a flowchart illustrating exemplary steps that are executed by the excess NH3 storage control of the present disclosure.

Referring now to FIG. 2, exemplary steps that are executed by the excess NH3 control will be described in detail. In step 200, control determines whether $T_{CAT}$ is greater than $T_{THR}$. If $T_{CAT}$ is greater than $T_{THR}$, control sets $\Delta m_{NH3CUM}$ equal to zero in step 202 and loops back to step 200. If $T_{CAT}$ is not greater than $T_{THR}$, control determines $m_{NH3IN}$ in step 204. Control determines $m_{NH3OUT}$ in step 206. In step 208, control calculates $\Delta m_{NH3CUM}$. In step 210, control determines $m_{NH3MAX}$.

Control calculates $i_{EXCSNH3}$ based on $m_{NH3MAX}$ and $\Delta m_{NH3CUM}$ in step 212. In step 214, control determines $k_{EXCSSTORE}$ based on $i_{EXCSNH3}$. Control regulates $\dot{m}_{DA}$ based on $k_{EXCSSTORE}$ in step 216 and control ends. It is anticipated, however, that the above-described, exemplary control will continue to loop through steps 200 to 216 at a pre-determined time interval or rate while the engine is running.

Figure 3:
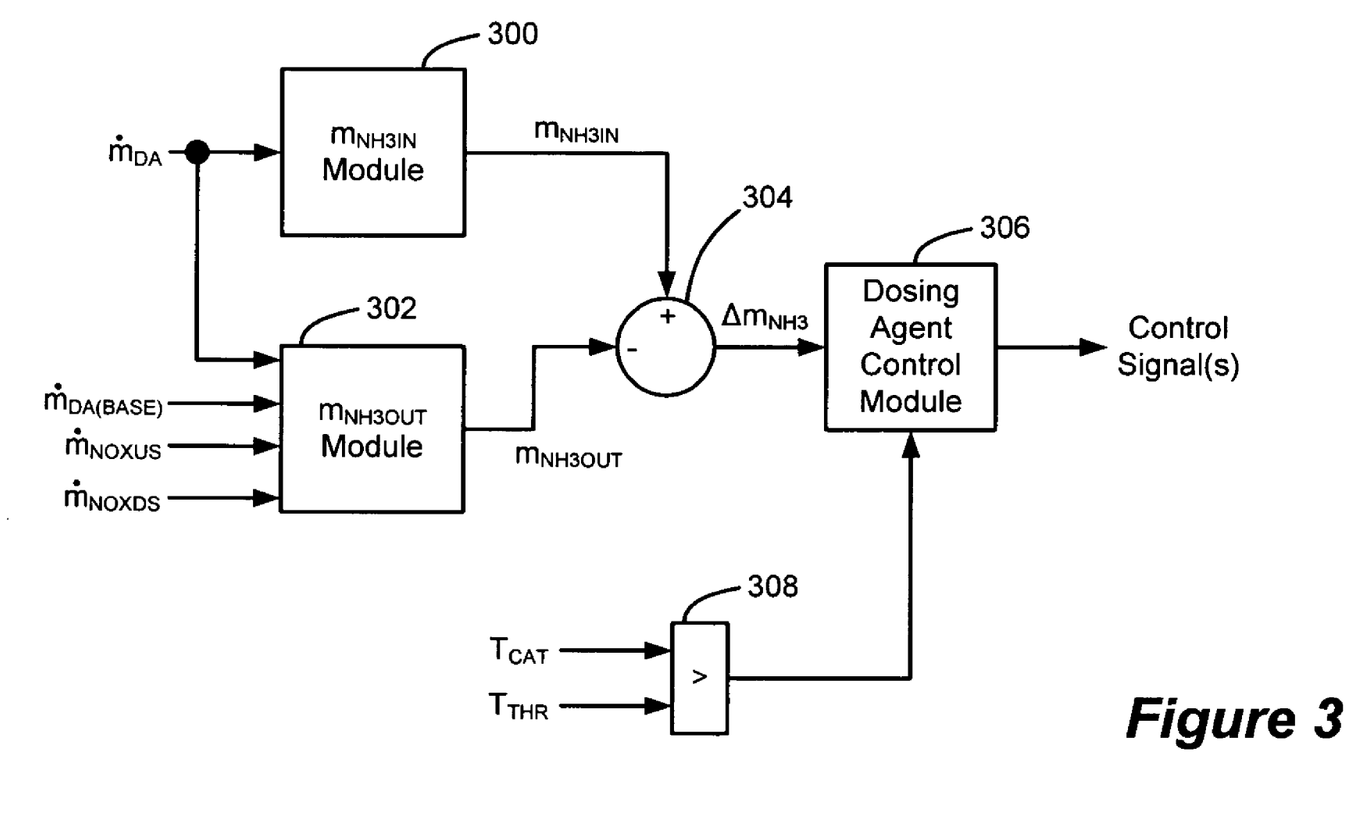
FIG. 3 is a functional block diagram of exemplary modules that execute the excess NH3 storage control.

Referring now to FIG. 3, exemplary modules that execute the excess NH3 control will be described in detail. The exemplary modules include a $m_{NH3IN}$ module 300, a $m_{NH3OUT}$ module 302, a summer module 304, a dosing agent control module 306 and a comparator module 308. The $m_{NH3IN}$ module 300 determines $m_{NH3IN}$ based on $\dot{m}_{DA}$, as described in detail above. The $m_{NH3OUT}$ module 302 determines $m_{NH3OUT}$ based on $\dot{m}_{NOXUS}$ and $\dot{m}_{NOXDS}$, as described in detail above and in further detail with respect to FIG. 5A below. Alternatively, the $m_{NH3OUT}$ module 302 determines $m_{NH3OUT}$ based on $\dot{m}_{DA(BASE)}$, as described in further detail with respect to FIG. 5B below. $\dot{m}_{DA(BASE)}$ is the stoichiometric NH3 quantity.

The summer module 304 determines $\Delta m_{NH3}$ as the difference between $m_{NH3IN}$ and $m_{NH3OUT}$. The dosing agent control module 306 monitors $\Delta m_{NH3CUM}$ and regulates $\dot{m}_{DA}$ based thereon. The dosing agent control module 306 also selectively resets $\Delta m_{NH3CUM}$, as described in detail above, based on a signal from the comparator module 308. More specifically, the comparator module 308 compares $T_{CAT}$ to $T_{THR}$. If $T_{CAT}$ is greater than $T_{THR}$, the signal from the comparator module 308 indicates that $\Delta m_{NH3CUM}$ should be reset. If $T_{CAT}$ is not greater than $T_{THR}$, the signal from the comparator module 308 indicates that $\Delta m_{NH3CUM}$ should not be reset.

Figure 4:
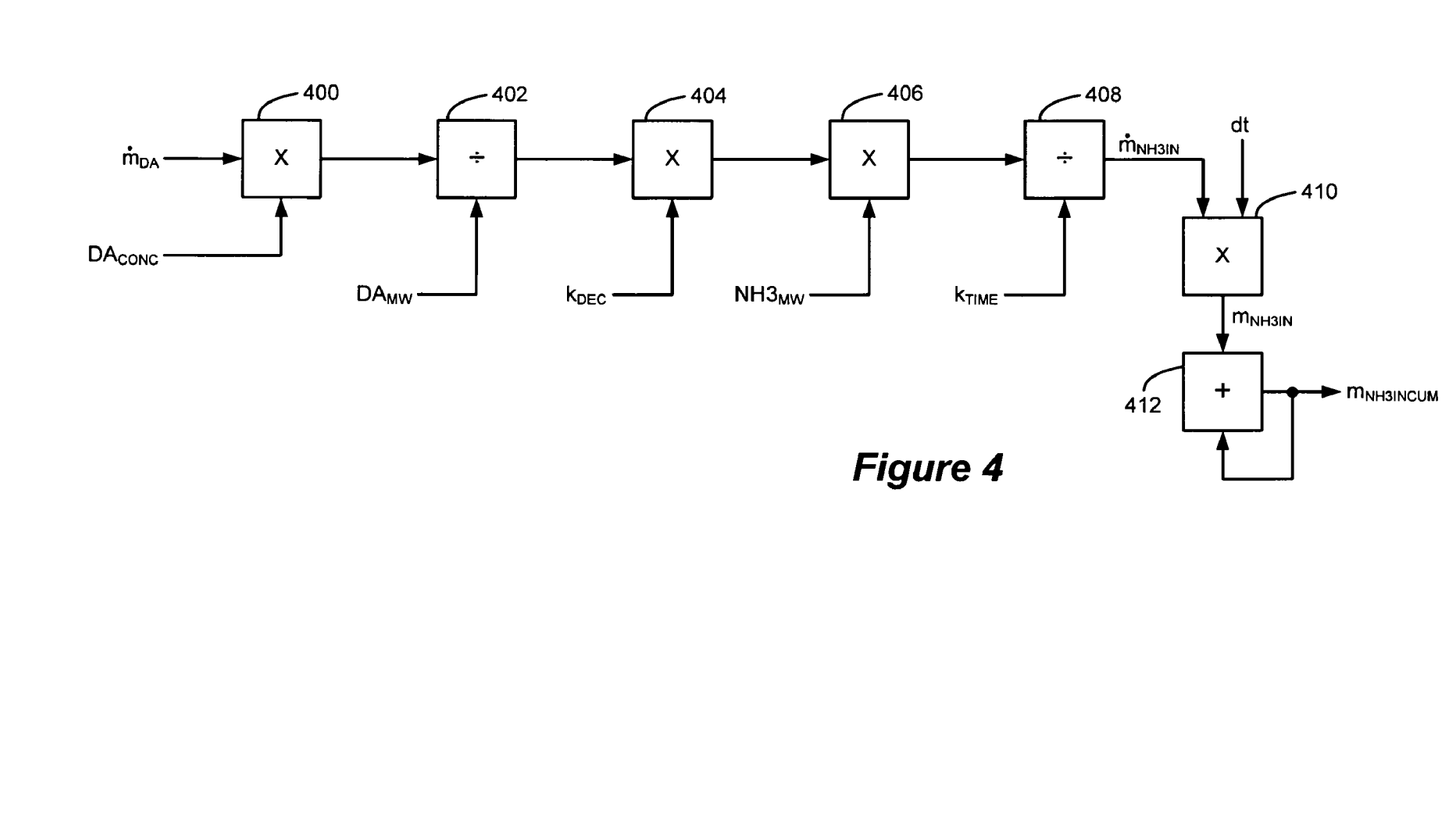
FIG. 4 is a functional block diagram of exemplary modules that are used to determine a cumulative NH3 value into the SCR catalyst.

Referring now to FIG. 4, exemplary modules that are used to calculate $m_{NH3IN}$ will be described in detail. The exemplary modules include a first multiplier module 400, a first divider module 402, second and third multiplier modules 404, 406, respectively, a second divider module 408, a fourth multiplier module 410 and an addition module 412. The modules 400, 402, 404, 406, 408 process $\dot{m}_{DA}$, $DA_{CONC}$, $DA_{MW}$, $k_{DEC}$, $NH3_{MW}$ and $k_{TIME}$ in accordance with Equation 1, described above, to provide $\dot{m}_{NH3IN}$. The fourth multiplier module 410 multiplies $\dot{m}_{NH3IN}$ by dt to provide $m_{NH3IN}$. The addition module 412, which may be optionally provided, accumulates the $m_{NH3IN}$ values to provide a cumulative $m_{NH3IN}$ ($m_{NH3INCUM}$).

Figure 5A:
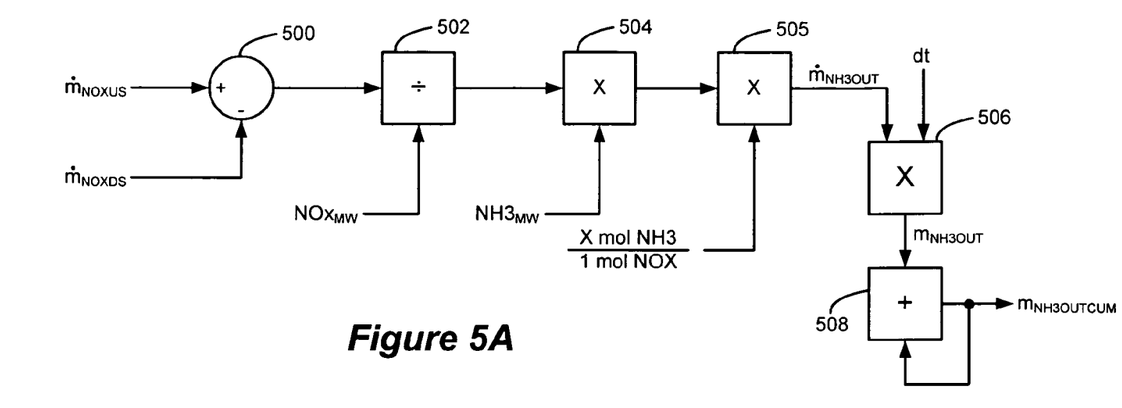
FIG. 5A is a functional block diagram of exemplary modules that are used to determine a cumulative NH3 value out of the SCR catalyst.

Referring now to FIG. 5A, exemplary modules that are used to calculate $m_{NH3OUT}$ will be described in detail. The exemplary modules include a summer module 500, a divider module 502, first, second and third multiplier modules 504, 505, 506, respectively, and an addition module 508. The modules 500, 502, 504, 505 process $\dot{m}_{NOXUS}$, $\dot{m}_{NOXDS}$, $NOx_{MW}$ and $NH3_{MW}$ to provide $\dot{m}_{NH3OUT}$. The third multiplier module 506 multiplies $\dot{m}_{NH3OUT}$ by dt to provide $m_{NH3OUT}$. The addition module 508, which may be optionally provided, accumulates the $m_{NH3OUT}$ values to provide a cumulative $m_{NH3OUT}$ ($m_{NH3OUTCUM}$). It is again noted that the molar ratio X between NH3 and NOx varies from 1 to 1.333 depending on the upstream % of $NO_2$.

Figure 5B:
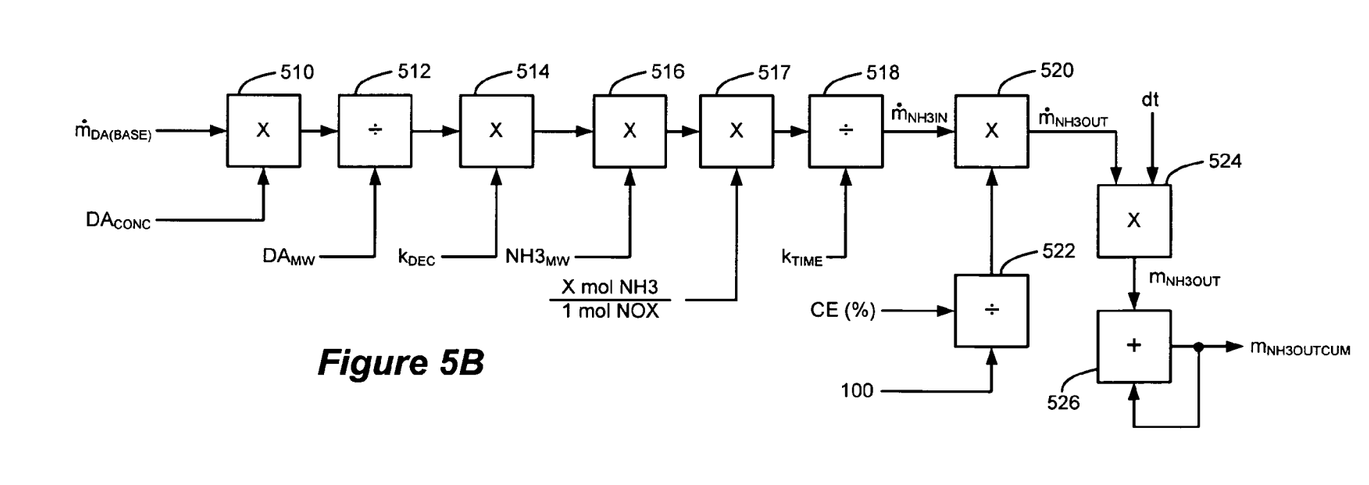
FIG. 5B is a functional block diagram of exemplary, alternative modules that are used to determine the cumulative NH3 value out of the SCR catalyst.

Referring now to FIG. 5B, alternative exemplary modules that are used to calculate $m_{NH3OUT}$ will be described in detail. As discussed in further detail below, the exemplary modules initially calculate $\dot{m}_{NH3OUT}$ based on $\dot{m}_{NH3IN}$ and a conversion efficiency (CE(%)) of the catalyst. CE(%) is determined based on several factors including, but not limited to, $T_{CAT}$, space velocity and $NO_2$ ratio.

The exemplary modules include a first multiplier module 510, a first divider module 512, second, third and fourth multiplier modules 514, 516, 517 respectively, a second divider module 518, a fifth multiplier module 520 a third divider module 522, a sixth multiplier module 524 and an addition module 526. The modules 510, 512, 514, 516, 517, 518 process $\dot{m}_{DA(BASE)}$, $DA_{CONC}$, $DA_{MW}$, $k_{DEC}$, $NH3_{MW}$ and $k_{TIME}$ in accordance with Equation 1, described above, to provide $\dot{m}_{NH3IN}$. The third divider module divides CE(%) by 100 to provide a decimal value of the conversion efficiency, which is then multiplied by $\dot{m}_{NH3IN}$ in the fifth multiplier module 520 to provide $\dot{m}_{NH3OUT}$. The sixth multiplier module 524 multiplies $\dot{m}_{NH3OUT}$ by dt to provide $m_{NH3OUT}$. The addition module 526, which may be optionally provided, accumulates the $m_{NH3OUT}$ values to provide $m_{NH3OUTCUM}$. Again, the molar ratio X between NH3 and NOx varies from 1 to 1.333 depending on the upstream % of $NO_2$.

Figure 6:
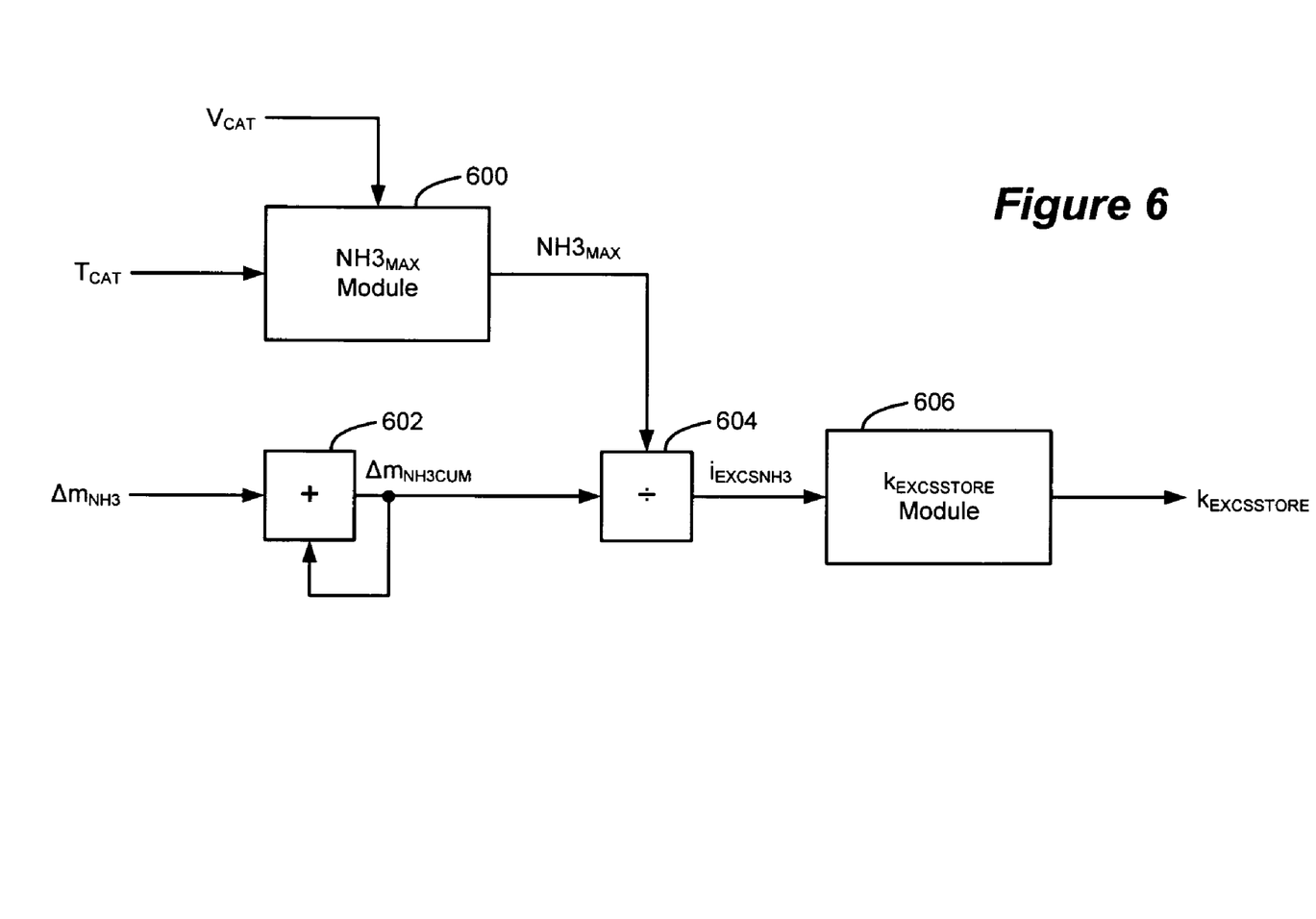
FIG. 6 is a functional block diagram of exemplary modules that are used to determine an excess NH3 storage multiplier in accordance with the excess NH3 storage control of the present disclosure.

Referring now to FIG. 6, exemplary modules that are used to determine $k_{EXCSSTORE}$ will be described in detail. The exemplary modules include a $m_{NH3MAX}$ module 600, an addition module 602, a division module 604 and a $k_{EXCSSTORE}$ module 606. The $m_{NH3MAX}$ module 600 determines $m_{NH3MAX}$ based on $T_{CAT}$ and $V_{CAT}$, as discussed above. The addition module 602 accumulates the $\Delta m_{NH3}$ values to provide $\Delta m_{NH3CUM}$. If, however, the addition modules 412 and 508, 526 of FIGS. 4 and 5A, 5B are included, the addition module 602 can be foregone because $\Delta m_{NH3CUM}$ will be provided based on $m_{NH3INCUM}$ and $m_{NH3OUTCUM}$ from the addition modules 412 and 508, 526. If the addition modules 412 and 508, 526 are not provided, the addition module 602 is provided. The division module 604 determines $i_{EXCSNH3}$ as a ratio between $\Delta m_{NH3CUM}$ and $m_{NH3MAX}$. The $k_{EXCSSTORE}$ module 606 $k_{EXCSSTORE}$ determines $k_{EXCSSTORE}$, as discussed in detail above.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of regulating an amount of NH3 stored in a catalyst of an exhaust after-treatment system, comprising:
   determining a mass of NH3 into the catalyst based on a dosing rate of a dosing agent that is injected into an exhaust stream upstream of the catalyst;
   determining a mass of NH3 out of the catalyst;
   calculating an accumulated mass of NH3 within the catalyst based on said mass of NH3 into the catalyst and said mass of NH3 out of the catalyst; and
   regulating said dosing rate based on said accumulated mass of NH3 within the catalyst.

2. The method of claim 1 wherein said mass of NH3 out of the catalyst is determined based on signals generated by NOx sensors that are located upstream and downstream of the catalyst, respectively.

3. The method of claim 1 further comprising determining a conversion efficiency of the catalyst based on a temperature of the catalyst, wherein said mass of NH3 out of the catalyst is determined based on a base dosing rate and said conversion efficiency.

4. The method of claim 1 further comprising:
   monitoring a catalyst temperature; and
   setting said accumulated mass of NH3 within the catalyst equal to zero when said catalyst temperature exceeds a threshold temperature.

5. The method of claim 1 further comprising determining a maximum NH3 storage mass of the catalyst based on a catalyst temperature, wherein said dosing rate is regulated based on said maximum NH3 storage mass.

6. The method of claim 5 further comprising calculating an excess NH3 storage ratio based on said accumulated mass of NH3 within the catalyst and said maximum NH3 storage mass, wherein said dosing rate is regulated based on said excess NH3 storage ratio.

7. The method of claim 6 further comprising determining an adjustment factor based on said excess NH3 storage ratio, wherein said dosing rate is regulated based said adjustment factor.

8. The method of claim 6 wherein said dosing agent is regulated to maintain said excess NH3 storage ratio to be less than 1.

9. An exhaust after-treatment system that regulates an amount of NH3 stored in a catalyst thereof, comprising:
   a first module that determines a mass of NH3 into the catalyst based on a dosing rate of a dosing agent that is injected into an exhaust stream upstream of the catalyst;
   a second module that determines a mass of NH3 out of the catalyst;
   a third module that calculates an accumulated mass of NH3 within the catalyst based on said mass of NH3 into the catalyst and said mass of NH3 out of the catalyst; and
   a fourth module that regulates said dosing rate based on said accumulated mass of NH3 within the catalyst.

10. The exhaust after-treatment system of claim 9 wherein said mass of NH3 out of the catalyst is determined based on signals generated by NOx sensors that are located upstream and downstream of the catalyst, respectively.

11. The exhaust after-treatment system of claim 9 further comprising a fifth module that determines a conversion efficiency of the catalyst based on a temperature of the catalyst, wherein said mass of NH3 out of the catalyst is determined based on a base dosing rate and said conversion efficiency.

12. The exhaust after-treatment system of claim 9 further comprising a temperature sensor that monitors a catalyst temperature, wherein said fourth module sets said accumulated mass of NH3 within the catalyst equal to zero when said catalyst temperature exceeds a threshold temperature.

13. The exhaust after-treatment system of claim 9 further comprising a fifth module that determines a maximum NH3 storage mass of the catalyst based on a catalyst temperature, wherein said dosing rate is regulated based on said maximum NH3 storage mass.

14. The exhaust after-treatment system of claim 13 further comprising a sixth module that calculates an excess NH3 storage ratio based on said accumulated mass of NH3 within the catalyst and said maximum NH3 storage mass, wherein said dosing rate is regulated based on said excess NH3 storage ratio.

15. The exhaust after-treatment system of claim 14 further comprising a seventh module that determines an adjustment factor based on said excess NH3 storage ratio, wherein said dosing rate is regulated based said adjustment factor.

16. The exhaust after-treatment system of claim 14 wherein said dosing agent is regulated to maintain said excess NH3 storage ratio to be less than 1.

17. A method of regulating an amount of NH3 stored in a catalyst of an exhaust after-treatment system, comprising:

determining a mass of NH3 into the catalyst based on a dosing rate of a dosing agent that is injected into an exhaust stream upstream of the catalyst;

determining a mass of NH3 out of the catalyst;

calculating an accumulated mass of NH3 within the catalyst based on said mass of NH3 into the catalyst and said mass of NH3 out of the catalyst;

determining a maximum NH3 storage mass of the catalyst;

calculating an excess NH3 storage ratio based on said maximum NH3 storage mass and said accumulated mass of NH3 within the catalyst; and regulating said dosing rate based on said excess NH3 storage ratio to maintain said excess NH3 storage ratio to be less than 1.

18. The method of claim 17 wherein said mass of NH3 out of the catalyst is determined based on signals generated by NOx sensors that are located upstream and downstream of the catalyst, respectively.

19. The method of claim 17 further comprising determining a conversion efficiency of the catalyst based on a temperature of the catalyst, wherein said mass of NH3 out of the catalyst is determined based on a base dosing rate and said conversion efficiency.

20. The method of claim 17 further comprising:
monitoring a catalyst temperature; and
setting said accumulated mass of NH3 within the catalyst equal to zero when said catalyst temperature exceeds a threshold temperature.

21. The method of claim 17 further comprising determining said maximum NH3 storage mass of the catalyst based on at least one of a catalyst temperature and a catalyst volume.

22. The method of claim 21 further comprising determining an adjustment factor based on said excess NH3 storage ratio, wherein said dosing rate is regulated based said adjustment factor.

* * * * *